(12) United States Patent
Kneckt et al.

(10) Patent No.: US 10,314,038 B2
(45) Date of Patent: Jun. 4, 2019

(54) COOPERATION IN CHANNEL RESERVATION

(75) Inventors: Jarkko Kneckt, Espoo (FI); Mika Kasslin, Espoo (FI); Janne Marin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1369 days.

(21) Appl. No.: 13/822,196

(22) PCT Filed: Aug. 8, 2011

(86) PCT No.: PCT/FI2011/050691
§ 371 (c)(1),
(2), (4) Date: Mar. 26, 2013

(87) PCT Pub. No.: WO2012/035196
PCT Pub. Date: Mar. 22, 2012

(65) Prior Publication Data
US 2013/0176980 A1    Jul. 11, 2013

Related U.S. Application Data

(60) Provisional application No. 61/832,055, filed on Sep. 13, 2010.

(51) Int. Cl.
*H04W 72/04* (2009.01)
*H04W 28/26* (2009.01)
(Continued)

(52) U.S. Cl.
CPC ....... *H04W 72/0453* (2013.01); *H04W 28/26* (2013.01); *H04W 48/08* (2013.01); *H04W 72/00* (2013.01)

(58) Field of Classification Search
CPC ..... H04W 28/26; H04W 48/08; H04W 72/04; H04W 72/00; H04W 72/0453; H04W 16/14
(Continued)

(56) References Cited

U.S. PATENT DOCUMENTS

2005/0124335 A1    6/2005   Cave et al.
2006/0159003 A1    7/2006   Nanda et al.
(Continued)

FOREIGN PATENT DOCUMENTS

CN    101442784    5/2009
CN    101521879    9/2009
(Continued)

OTHER PUBLICATIONS

International Search Report for International Application No. PCT/FI2011/050691—Date of Completion of Search: Nov. 11, 2011, 4 pages.
(Continued)

*Primary Examiner* — Will W Lin
(74) *Attorney, Agent, or Firm* — Locke Lord LLP

(57) ABSTRACT

The present document provides a method, apparatus, and computer program for determining, in a communication device of a first basic service set comprising a group of communication devices of a wireless telecommunication network, a primary channel of a second basic service set different from said first basic service set. Thereafter, the communication device causes transmission of channel identification information defining a location of at least one channel of the first basic service set from the communication device to the second basic service set on the determined primary channel of the second basic service set.

20 Claims, 5 Drawing Sheets

(51) Int. Cl.
*H04W 48/08* (2009.01)
*H04W 72/00* (2009.01)

(58) Field of Classification Search
USPC .................................. 370/329, 252, 254
See application file for complete search history.

(56) References Cited

U.S. PATENT DOCUMENTS

| | | | | |
|---|---|---|---|---|
| 2009/0080388 | A1* | 3/2009 | Rohfleisch | H04B 7/024 370/338 |
| 2009/0279524 | A1* | 11/2009 | Yu | H04W 74/0833 370/338 |
| 2010/0105332 | A1* | 4/2010 | McHenry | H04W 16/14 455/62 |
| 2012/0057534 | A1* | 3/2012 | Park | H04W 72/082 370/329 |
| 2013/0028245 | A1* | 1/2013 | Oerton | H04W 4/00 370/338 |
| 2014/0307726 | A1* | 10/2014 | Kang | H04W 76/023 370/338 |

FOREIGN PATENT DOCUMENTS

| | | |
|---|---|---|
| EP | 1804424 | 7/2007 |
| EP | 1931086 | 6/2008 |
| WO | WO2006/069176 | 6/2006 |

OTHER PUBLICATIONS

English Language Machine Translation of Chinese Patent Application Publication No. CN101442784, 8 pages.
English Language Machine Translation of Chinese Patent Application Publication No. CN101521879, 9 pages.
EP Communication dated Mar. 20, 2018 for European Patent Application No. 11824628.9, 7 pages.

* cited by examiner

COOPERATION IN CHANNEL RESERVATION

FIELD

The invention relates to the field of wireless telecommunications and, particularly, to cooperation in reserving a communication channel for transmission.

BACKGROUND

Wireless Local Area Network (WLAN) has undergone vast development in order to increase throughput. Task groups such as 802.11b, 802.11a, 802.11g and 802.11n have demonstrated continuous improvement of the WLAN radio throughput. 802.11ac is another task group that is developing the WLAN radios that operate at a frequency spectrum below 6 GHz and especially at 5 GHz. There exist other task groups within the IEEE 802.11 standardization.

Channelization rules for 802.11ac radios are currently under development. The rules define the frequency channels available for 802.11 ac transmitters. The rules are based on a scheme of a primary channel and secondary channels. The scheme follows a principle where each network or basic service set (BSS) has a primary channel and zero or more secondary channels. The primary channel is used for channel contention, and transmission opportunity (TXOP) is gained based on carrier sensing on the primary channel. A BSS allocates its secondary channel preferably to a frequency band not occupied by a primary channel of another BSS. Furthermore, the contending station (STA) may use the secondary channel for transmission only if the secondary channel has been free for a given time prior to a TXOP start time.

BRIEF DESCRIPTION

According to an aspect of the present invention, there is provided a method as specified in claim 1.

According to another aspect of the present invention, there is provided an apparatus as specified in claim 17.

Embodiments of the invention are defined in the dependent claims.

LIST OF DRAWINGS

Embodiments of the present invention are described below, by way of example only, with reference to the accompanying drawings, in which FIG. 1 illustrates a wireless communication environment to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
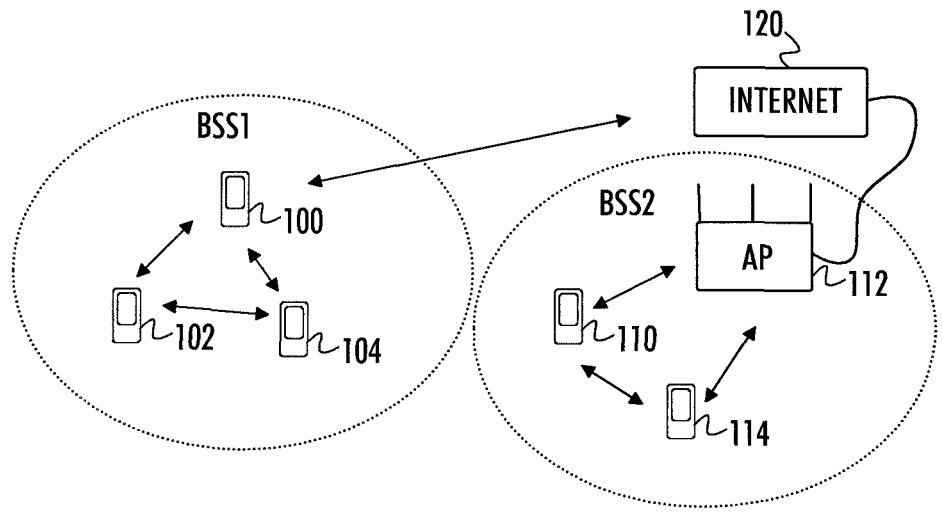

A general architecture of a wireless telecommunication system to which embodiments of the invention may be applied is illustrated in FIG. 1A. FIG. 1A illustrates two groups of wireless communication devices forming two basic service sets, i.e. groups of wireless communication devices comprising an access point (AP) 100, 112 and terminal stations (STA) 102, 104, 110, 114 communicating with the access points 100, 112 of their respective groups. A basic service set (BSS) is a basic building block of an IEEE 802.11 wireless local area network (WLAN). The most common BSS type is an infrastructure BSS that includes a single AP together with all associated STAB. The AP may be a fixed AP as AP 112, or it may be a mobile AP as AP 100. The APs 100, 112 may also provide access to other networks, e.g. the Internet. In another embodiment, at least one of the BSSs is an independent BSS (IBSS) without dedicated AP.

The 802.11n specifies a data transmission mode that includes 20 MHz wide primary and secondary channels. The primary channel is used in all data transmissions, and with clients supporting only the 20 MHz mode. A further definition in 802.11 n is that the primary and secondary channels are adjacent. The 802.11n specification also defines a mode in which a STA can have only one secondary channel which results in a maximum bandwidth of 40 MHz. IEEE 802.11ac task group extends such an operation model to provide for wider bandwidths by increasing the number of secondary channels from 1 up to 7. The workgroup is expected to specify bandwidths of 20 MHz, 40 MHz, 80 MHz and 160 MHz. The 802.11ac task group defines channelization for these modes. At the moment, the channelization principle is not yet decided. Candidates for channelization include:

1) Strict channelization: transmissions may be performed only on predefined channel groups, and the lowest 20 MHz channel of the transmission band is the primary channel. The transmission band in this context refers to a set of contiguous channels, e.g. a 80 MHz transmission band formed by contiguous channels. The BSS may have a plurality of such transmission bands, e.g. two 80 MHz transmission bands for 160 MHz operation. The primary channels will be 20 MHz channels that may be named to be IEEE channels 36 to 39, 52 to 55, 100 to 103, 116 to 119 and 149 to 152;

2) Relaxed channelization: contiguous channels may establish a transmission band for 40/80 MHz transmissions, i.e. 80 MHz transmission could be performed in channels 44-56. Similarly the primary channel may be more freely selected. The primary channel may be the lowest or the highest channel 20 MHz of the contiguous channels, or it may be any other channel.

Figure 2:
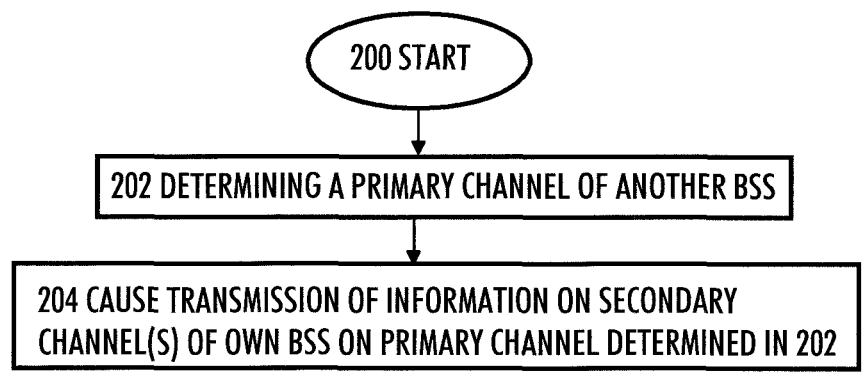
FIG. 2 illustrates cooperative channel protection according to an embodiment of the invention.

In both channelization schemes from the point of view of a given BSS, it would be preferable to detect utilization of the primary and the secondary channels of other BSSs and to protect ongoing transmissions on secondary channels of the own BSS. In an embodiment of the present invention, a communication device of a first BSS is configured to inform at least a second BSS (different from the first BSS) about the primary and secondary channels used in the first BSS by transmitting such information on a primary channel of the second BSS. To this end, the communication device and, in particular, a processor in the communication device, is configured to carry out a process illustrated in FIG. 2. The process may be carried out as a computer program executed by the processor. Referring to FIG. 2, the process starts in block 200.

In block 202, it is determined a primary channel of the second BSS. The primary channel of the second BSS may be detected in any manner, e.g. by sensing frequency channels used in the first BSS and/or other frequency channels. Other embodiments for carrying out block 202 will be described later.

In block 204, the process causes transmission of channel identification information defining a location of at least one secondary channel of the first BSS from the communication device to the second BSS on the determined primary channel of the second BSS. An advantage of this embodiment is that the first BSS may protect the transmissions on its primary and secondary channel(s) by informing neighboring BSSs about its primary and secondary channels, thereby resulting in a lower collision overhead and improved reliability in data transmissions on the secondary channels. In other words, the secondary channel is provided with protection additional to conventional Clear Channel Assessment where communication devices sense channel occupation on the basis of energy received from the channel. Moreover, as the first BSS informs about its secondary channels on the primary channel of the second BSS, all communication devices of the second BSS are able to receive the information. In block 204, the communication device may inform the second BSS about only the secondary channels the communication device itself uses. In another embodiment, the communication device informs the second BSS about the secondary channels another communication device of the first BSS uses. In another embodiment, the communication device informs the second BSS about all the secondary channels used in the BSS.

The primary channel may be used for communications with STAs incapable of 40, 80 and 160 MHz mode. The secondary channels may be used as additional bandwidth between a transmitter-receiver pair where both support transmissions on bandwidths wider than 20 MHz in order to have higher data rates. In transmissions using the secondary channels, the transmitter carries out the transmission simultaneously or substantially simultaneously on the primary channel and possible also on the secondary, tertiary and quartiary channels. The channels are named to represent the order in which they are taken into use, e.g. the primary channel is 20 MHz in bandwidth, primary and secondary channel together create 40 MHz band and 80 MHz is achieved by using all the above-mentioned channels. Secondary, tertiary, and quartiary channels are bundled under the same term "secondary channel" in this description for the sake of clarity.

With respect to block 202 of FIG. 2, the detection of the primary channels of other BSSs may be carried out according to several principles in the first BSS. The wireless communication devices of the first BSS, i.e. the AP and/or the STAB, may scan, in addition to the primary and secondary channels of the first BSS, other channels that are adjacent or at determined distance in frequency from the operative channels of the first BSS, e.g. within 60 MHz offset from the primary or tertiary channels of the first BSS. The 60 MHz scanning distance may be justified by assuming 80 MHz transmission band usage, so BSS whose primary channel is within 60 MHz distance from the primary and tertiary channels of the first BSS may overlap with operative channels of the first BSS. The communication devices of the first BSS try to detect and discover operative channels of other BSSs by receiving a transmission that overlaps with its primary or secondary channels, as shown and discussed in FIG. 4, by monitoring for beacon frames on determined channels, and/or by transmitting probe request frames on the determined channels. On the basis of received beacon frames and/or probe responses, the primary channel of the other BSS may be determined. Beacon transmissions and Probe.Response messages contain an information element "Secondary Channel Offset" that may be used to determine the operative channels of the other BSSs. The secondary channel offset field represents the position of the secondary channel relative to the primary channel, i.e. above or below the primary channel. The channel monitoring may be performed at least when the BSS is established. When the AP or STA is mobile, for instance it operates according to WiFi-Direct specifications and is realized by a mobile handheld or laptop device, it may be configured to perform the scanning more often to take into account the fact that the communication environment varies because of the mobility.

Figure 3:
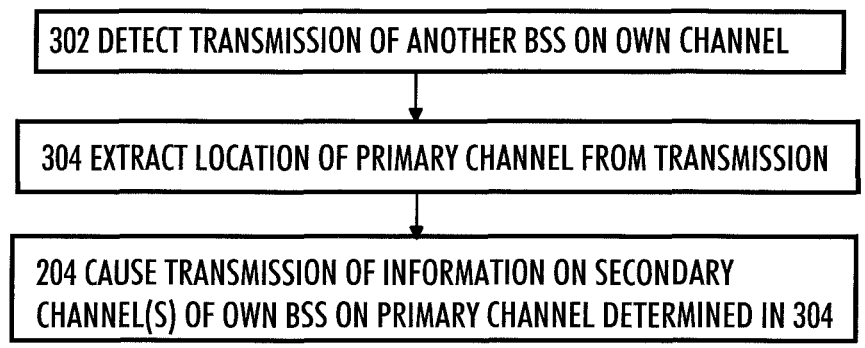
FIG. 3 is a flow diagram of a process for detecting other basic service sets according to an embodiment of the invention.

In an embodiment of block 202, the communication device of the first BSS determines the location of the primary channel of the second BSS on the basis of received transmissions. The monitoring process is described in FIG. 3 and the details and examples of the monitoring operation are shown in the FIG. 4. FIG. 3 illustrates en embodiment of a process related to carrying out block 202. The communication device is configured to monitor the primary channel and secondary channel(s) of the first BSS to detect new transmissions on those channels. Every transmission in any BSS must use the primary channel of the respective BSS, and it may use one or more secondary channels of the respective BSS. Upon detection of a transmission in block 302, the communication device may extract control information contained in the data transmission so as to determine whether or not the data transmission is destined to a communication device in the first BSS. Such information may be extracted from a physical layer convergence procedure (PLOP) protocol data unit (PPDU) carried in the detected transmission. The preamble may comprise a short and/or long training symbols, i.e. the physical layer convergence procedure (PLOP) preamble and a PLOP header appended with very high throughput (VHT) headers when VHT transmission is performed. If the data transmission is detected only on the secondary channel (i.e. not simultaneously on the primary channel) of the first BSS, it is implicit that the transmission relates to another BSS. Upon determining that the transmission relates to another BSS, the location of the primary channel is extracted in block 304 from the control information contained in the PPDU. Such control information contained in the PPDU or as a separate message may comprise information that enables the communication device to detect the primary channel of the other BSS. For example, the control information may contain information on the transmission bandwidth. Bandwidth together with knowledge about the location of the primary channel on the transmission band (known beforehand to be on the lowest/highest channels, or it may be indicated in the received control information) enables the detection of the primary channel. As an embodiment of such control information, the PPDU comprises a very high throughput signal signaling field A (VHT-Sig-A) field that comprises a bandwidth (BW) field. The BW field indicates the bandwidth of the transmitted PPDU. Depending on the channelization principle, which may be indicated by a Primary Channel Present bit, the primary channel of the transmission is the lowest or the highest 20 MHz band of the transmission, or if the other BSS uses a non-continuous 160 MHz transmission mode, the primary channel may be in completely different spectrum area. This may also be indicated by an information element in the PPDU.

The primary channel may be constantly set to be the lowest 20 MHz band of the transmission, or the location of the primary channel may be advertised in the VHT-SIG A field, i.e. the VHT-SIG A field may comprise a bit which indicates whether the primary channel may be the highest or the lowest 20 MHz band in the BW used for transmitting the PPDU. For clarity, let us assume that the primary channel is the lowest 20 MHZ channel. The VHT-SIG A field may also contain an information element "Primary Channel Present" to indicate whether the primary channel is on this transmission band. Value 0 of "Primary Channel Present" may indicate that the primary channel is not present, i.e. the primary channel is transmitted on the other 80 MHz band of a non-consecutive 160 MHz band, and value 1 may indicate that the presence of the primary channel on the detected 80 MHz transmission band.

In some future amendments to the non-continuous transmissions, a transmission may contain more than one non-contiguous secondary channels, and the channels may occupy different bandwidth sizes, i.e. a given non-contiguous secondary channel may have a bandwidth of 40 MHz and a set of channels that contains the primary channel may have a bandwidth of 20 Mhz. In all cases, the same bit may indicate whether or not the transmission contains the primary channel.

Accordingly, the communication device may discover the primary channel of the transmitting device, i.e. the primary channel of the other BSS. An embodiment configures the communication device to receive transmissions that are transmitted on its secondary channel, but not on its primary channel. In this embodiment, the communication device may be configured to synchronize to the secondary channel transmission, if there is currently no transmission on its primary channel. If the communication device detects a transmission on its primary channel, it may terminate the reception on the secondary channel and start reception of the primary channel transmission. When the communication device receives a transmission only on its secondary channel, it may detect the transmitter and its primary channel by receiving and decoding the preamble, PLCP headers to discover the primary channel of the transmitting BSS. The communication device may also receive the medium access control (MAC) headers to learn the MAC address of the transmitter, BSS type (infrastructure, independent, mesh) and a BSS identifier (BSSID) whenever it is present.

The above-mentioned embodiments for scanning for the other BSSs may also be used to detect whether or not the secondary channel of the first BSS overlaps with the primary channel of the other BSS. Such overlapping between a secondary channel and a primary channel of different BSSs is generally prohibited in 802.11 and, therefore, these embodiments also enable more efficient operation according to the system specifications. Examples of the operation of the above-mentioned embodiments for carrying out the scanning are described next in connection with FIG. 4.

Figure 4:
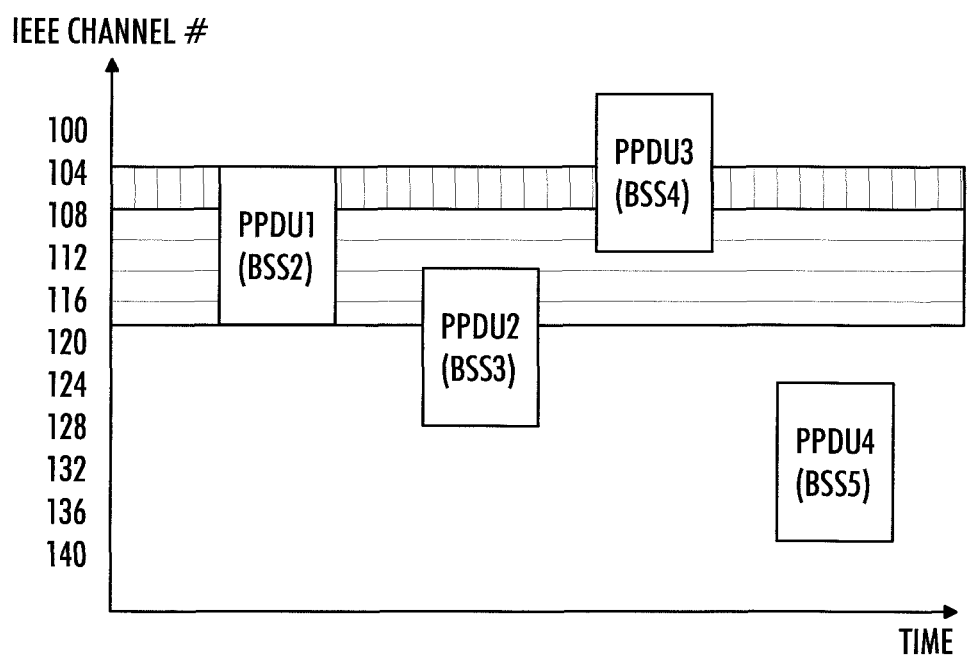
FIG. 4 illustrates examples related to scanning for the other basic service sets.

Referring to FIG. 4, let us assume that the first BSS has an operative channel with bandwidth of 80 MHz as shown by the combination of horizontal and vertical linings in FIG. 4. Let us also assume that the primary channel of the first BSS is on the lower half of the bandwidth as shown by the vertical lining. Accordingly, the primary channel occupies channels 104 to 107. The secondary channel of the first BSS is shown in FIG. 4 by the horizontal lining, i.e. the secondary channel occupies channels 108 to 119. Let us now consider different channel arrangements for other BSSs whose transmissions the communication device of the first BSS is able to receive. The communication device is arranged to scan for transmissions only on its own operative channels. In the first example, the communication device receives PPDU1 from a second BSS which has its primary channel at the same IEEE channels as the first BSS, i.e. the primary channel of the transmitted PPDU occupies channels 104 to 107. The PPDU1 is transmitted according to the 802.11ac specifications for channel occupation, and there is no need to channel rearrangements. The communication device is able to receive the PPDU1, as it is transmitted on the operative channels of the communication device and, thus, it is also able to synchronize to the transmission, extract the PLOP and MAC header information to discover the location of the primary channel of the second BSS.

In case the primary channel of the second BSS is on the highest 20 MHz band, i.e. in IEEE channels 116-119, the first BSS may be configured to avoid transmissions on the primary channel of the second BSS, and the first BSS may transmit 40 MHz transmissions on IEEE channels 104-111. Similarly the second BSS may use 40 MHz transmissions on channels 112-119. Both BSSs may transmit 60 MHz wide transmissions, if such a transmission band is supported by the specification of the network used by the BSSs.

PPDU2 is transmitted by a third BSS having its primary channel on channels 112 to 115. Now, the primary channel of the third BSS is located on the same channels as some of the secondary channels of the first BSS. Therefore, the communication device of the first BSS should take measures so as not to use the channels 112 to 115 as its secondary channel, i.e. follow the 802.11 n rule that the primary channel of another BSS shall not be used as the secondary channel. The first BSS may continue to use channels 104-111 that generates continuous 40 MHz band. If the first BSS supports non-contiguous channel arrangements, the first BSS may also continue operation on channels 116 to 119. Such a non-contiguous channel arrangement has been proposed at least for IEEE 802.11af, but it may be applied to other networks, too. In response to detecting that the secondary channel of the first BSS is on the primary channel of the second BSS, the communication device may initiate a procedure for channel rearrangement. It may include communication with an access point and/or with other STAB of the first BSS so that the channel rearrangement is realized. As the PPDU2 is also transmitted on the channels that the communication device monitors, the communication device is able to receive the PPDU2, and to detect the primary channel of the BSS3 from the header information of the PPDU2, as described above.

In case the primary channel of the third BSS is on the highest 20 MHz band, i.e. in IEEE channels 120-123, both the first BSS and the third BSS may transmit at full 80 MHz band. The overlapping 40 MHz band on channels 112-119 may be protected according to certain embodiments of the invention.

PPDU3 is transmitted by a fourth BSS having its primary channel on channels 100 to 103. Now, the fourth BSS should carry out the channel rearrangement and avoid using at least channels 104 to 107 as its secondary channels, because the primary channel of the first BSS is located on those channels. The communication device is able detect the transmission of the PPDU3 on its primary channel and on its secondary channel(s) and is capable to discover the primary channel of the fourth BSS because of the overlapping channels.

In case the primary channel of the primary channel of the fourth BSS is on the highest 20 MHZ band, i.e. IEEE channels 108-111, the fourth BSS may use only its primary channel. Similarly, the first BSS may use only its primary channel.

PPDU4 is transmitted by a fifth BSS on channels 124-139. The channels of the first and the fifth BSS do not overlap and, therefore, both the first BSS and the fifth BSS may retain their channel arrangements. The communication device probably does not detect the PPDU4, unless it is performing scanning on channels other than those used in the first BSS. With respect to the protection of the secondary channel utilization in the first BSS, it may not be necessary to detect the primary channel of the fifth BSS, because the transmissions of these BSSs do not interfere with each other because of the non-overlapping channels.

Let us now describe embodiments for carrying out block 204 of FIG. 2. The described embodiments may be combined with the embodiments for implementing the scanning as described above in connection with FIGS. 3 and 4, or the embodiments for notifying the other BSSs about the secondary channels of the first BSS may be used in connection with other means for determining the location of the primary channel(s) of other BSS(s). It should be noted that one channel may operate as primary channel for zero to multiple BSSs.

According to an embodiment, the communication device of the first BSS causes the transmission of the information on the secondary channels of the first BSS to the other BSS(s) on the primary channel(s) of the other BSS(s) in a message transmitted at determined time intervals and addressed to a group address or so called broadcast address or at least one communication device of the other BSS(s). In other words, the message may be a unicast, multicast, or a broadcast message. An example of such a message is a measurement pilot frame. The measurement pilot frame is as such known in the 802.11 networks, and it may be used by the AP or STA as a short action frame transmitted pseudo-periodically at a small interval as compared with a beacon interval. The measurement pilot frame typically provides a subset of information comprised in the beacon frame and, as a consequence, the measurement pilot frame is smaller than the beacon frame but it is transmitted more often. The measurement pilot frame assists a STA to reduce the time required for passive scanning and in channel condition measurements. In an embodiment, the measurement pilot frame may be transmitted by the AP and/or the STA so as to notify the neighboring BSSs about the secondary channels used in the first BSS. The measurement pilot frame according to the embodiment comprises a MAC address of the transmitting communication device of the first BSS, channel identification information identifying the primary and the secondary channels used in the first BSS, and a destination field identifying the recipient(s) of the measurement pilot frame. The destination field may identify an address of an individual communication device, or it may identify a group address of a plurality of communication devices. If the first BSS is configured to utilize a non-contiguous 160 MHz transmission (two 80 MHz bands) or any other type of non-contiguous transmission, the channel identification information may identify all the channels used by the first BSS. This enables the other BSS(s) to carry out channel rearrangement to avoid using the primary channel of the first BSS as the secondary channel. Accordingly, the first BSS may protect its primary channel from secondary channels of the other BSS(s). Additionally, as the first BSS informs the other BSS(s) about its secondary channels, the other BSS(s) are aware of the channel usage of the first BSS and, thus, are able to determine the possibly overlapping secondary channels. Therefore, the time to detect other BSS by using the overlapping channels and the need for any BSS to scan for neighboring channels to discover other BSSs is reduced.

In order to protect the transmission on the secondary channels by means additional to a conventional channel clear assessment (CCA) based on sensing energy in the channel, the communication device may be configured to notify the other BSS(s) on their primary channels, whenever there is a data transmission on at least one of the secondary channels of the first BSS. Such a notification may be seen as distribution of the secondary channel network allocation vector (NAV) information on one or more primary channel(s) of the other BSS(s). A conventional NAV sets a time period during which no other transmissions may be carried out on a channel where the transmission is received. Typically such a channel is the primary channel. The conventional NAV does not take into account the fact that only the secondary channel(s) of the BSS may overlap with another BSS and, therefore, the secondary channels require protection. Also another BSS is not likely able to receive transmissions that are not transmitted on their primary channel. Therefore, the secondary channel(s) is/are protected only by the CCA.

According to an embodiment, the communication device of the first BSS transmits a control frame instructing one or more communication devices of the first BSS to transmit a reservation frame on the primary channel of at least the second BSS. The communication device transmits the control frame before carrying out data transmission so that the other communication devices are able to receive and extract the control frame and to transmit the reservation frame. The reservation frame transmitted to the second BSS prevents the communication devices of the second BSS from carrying out data transmission on the at least one channel of the first basic service set. Then, the communication device that transmitted the control frame carries out the data transmission after transmitting the control frame. The data transmission is thus carried out by using a different frame than the control frame.

Similarly, the communication device may receive from another communication device of the first BSS such a control frame instructing the communication device to transmit the reservation frame. The reception and extraction of such a frame configures the communication device to transmit the reservation frame on the primary channel of at least the second BSS, thereby preventing the communication devices of the second basic service set from carrying out data transmission on the at least one secondary channel of the first basic service set.

Figure 5:
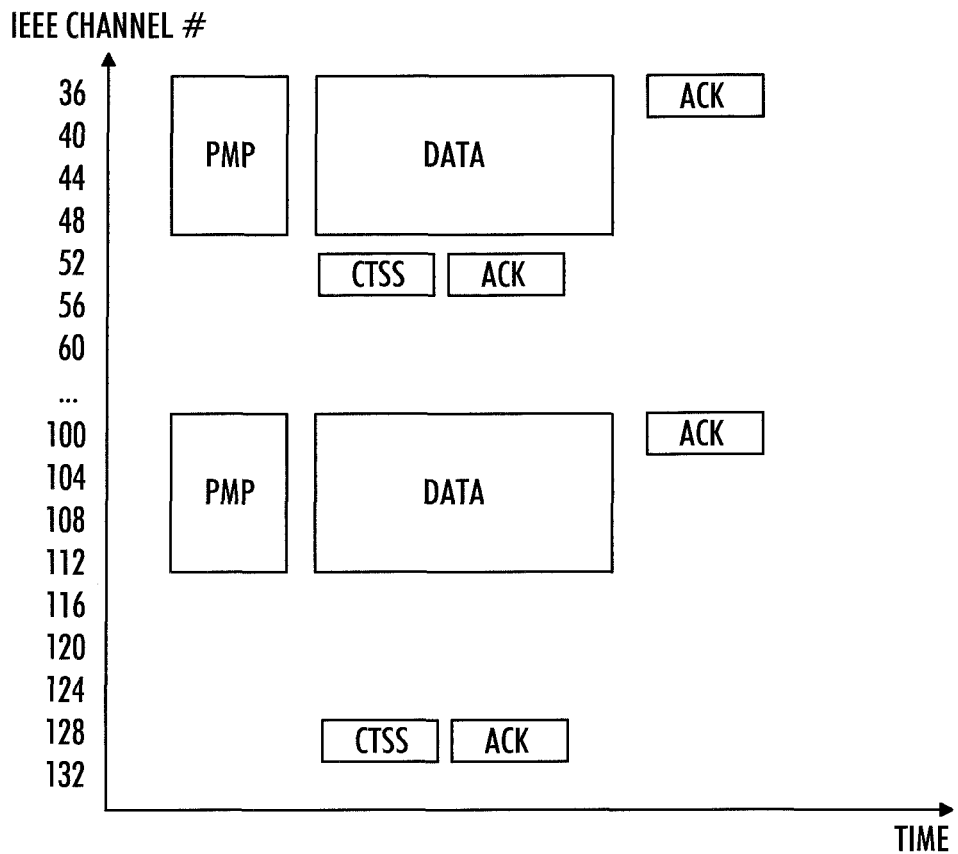
FIGS. 5 and 6 illustrate an embodiment for protecting transmissions on secondary channels by using a control frame according to an embodiment of the invention.
Figure 6:
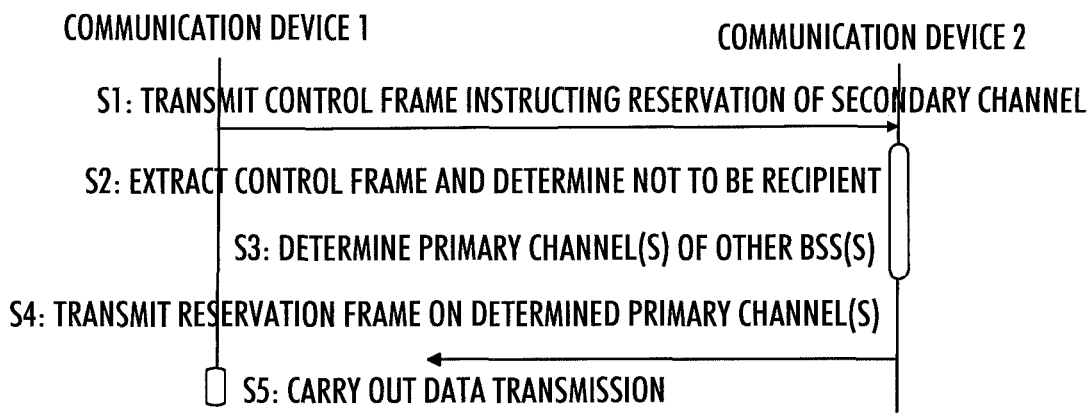

FIGS. 5 and 6 illustrate embodiments of this type of transmission protection. In FIG. 5, it is assumed that the first BSS occupies channels 36 to 50 and 100 to 114, i.e. two non-contiguous 80 MHz bands. The first BSS has also discovered two other BSSs having their respective primary channels on channels 52 to 55 and 128 to 131. FIG. 6 illustrates a signaling diagram between two communication devices of the first BSS in connection with data transmission on the channels of the first BSS. Referring to FIGS. 5 and 6, a first communication device is about to carry out a data transmission and, therefore, it transmits the above-mentioned control frame to a second communication device in S1. The control frame may be a protecting multi-poll (PMP) frame used to organize communication devices of the same BSS to protect the transmission. The PMP frame may have a structure illustrated in Table 1 below. The structure is merely exemplary.

TABLE 1

| Field Order | Field Information |
| --- | --- |
| 1 | Category |
| 2 | Action |
| 3 | Duration |
| 4 | Number of the lowest channel protected |
| 5 | Number of the highest channel protected |
| 6 | Time to transmit NAV |
| 7 | PMP Parameter Set |
| 8 to (N_STA + 6) | PMP Parameter Set (N_STA is the number of the PMP Parameter Set fields) |

Category and action fields are set to describe PMP frame type and a specific operation frame, i.e. to identify the frame. Duration field may have two octets, and it may specify the duration of the data transmission in microseconds. The value of the duration field will be used to set the NAV protection duration or to maintain the energy transmission on the primary channel of the other BSS(s). The number of the lowest channel protected identifies the lowest channel number that is to be protected. The number of the highest protected channel specifies the highest channel number that is to be protected. The time to transmit NAV sets a duration within which the reservation frame must be transmitted, i.e. it specifies the transmission timing for the data transmission together with the duration field. The PMP Parameter Set contains one or more PMP Parameter Sets. A PMP parameter set may have a structure illustrated in Table 2:

TABLE 2

| Field Information | Length in octets |
| --- | --- |
| Element ID | 1 |
| Length | 1 |
| MAC Address1 | 6 |
| MAC Address2 | 6 |
| Channel Offset | 1 |

The Element ID specifies an identifier of the information element (the PMP parameter set) and it is used to detect the information element type. A unique element ID will be assigned for this information element.

The Length field of the information element contains an unsigned integer that specifies the amount of octets that the information element occupies and it may be set to 7, for example.

MAC Address1 field identifies the device that will transmit the reservation frame, i.e. to which communication device the PMP frame is addressed.

MAC Address2 field indicates an address to which the reservation message is to be targeted. The target address may be individual address, i.e. the MAC address of the STA of the other BSS that will acknowledge the reservation message, or group address if no acknowledgement is desired.

A channel offset defines a signed integer that provides a multiple of 4 IEEE channels that should be added to the current primary channel in order to calculate the channel to which the reservation message should be transmitted, i.e. the location of the primary channel(s) of the other BSS(s). This configures the transmitter of the reservation frame to transmit a frame containing secondary channel NAV information to a correct channel. The channel offset and the PMP frame may also be used to indicate on which channels the recipient of the control frame is instructed to monitor activity of other BSSs.

As shown in FIG. 5, the control frame, i.e. the PMP frame, may be transmitted on all bands where the data transmission is to be carried out. Accordingly, a single control frame may be transmitted to contiguous channels, and a separate control frame may be transmitted to non-contiguous channels. The second communication device receives the PMP frame in S1 (FIG. 6) and extracts the control frame in S2 to recover the control information needed for deciding should it transmit the reservation frame and the location of the primary channel of the other BSS and the channels to be protected. In S2, the second communication device also determines whether or not it is the recipient of the data transmission. Such information may be contained in the PMP message. If the second communication device is the recipient, it prepares for data reception. Otherwise, it proceeds to S3. In S3, the second communication device determines the location of the primary channel(s) of the other BSSs (channels 52 to 55 and 128 to 131 in this example). In S4, the second communication device tunes its transmitter to the channel(s) determined in S3 and transmits the reservation frame on the primary channels of the other BSS(s). The reservation frame may be a clear-to-send-secondary (CTSS) message that identifies the channels that are to be protected, the duration for how long they are to be protected, etc. The CTSS message may have a structure shown in Table 3 below.

| Field Information | Length in octets |
| --- | --- |
| Frame control | 2 |
| Duration | 2 |
| RA | 6 |
| TA | 6 |
| Duration of Secondary NAV | 2 |
| Amount of Offsets | 1 |
| Channel offsets 1 . . . | 1 |
| Channel offsets n | 1 |
| FCS | 4 |

The Duration field contains an unsigned integer indicating the duration of the NAV. The RA field is the MAC address of the CTSS frame recipient. It may be set to the same value as indicated in MAC Address2 field in PMP frame. The TA address is the MAC address of the CTSS frame transmitter. If the address is individual address, the CTSS frame shall be acknowledged when it is correctly received.

The Duration of Secondary NAV field is an unsigned integer indicating the duration of the secondary channels NAV in units of microseconds. The secondary channel NAV is set to channels as specified in Lowest and Highest Protected Channel fields. The Number of Offsets defines the amount of Channel Offset elements. The Offsets field identifies the lowest channel protected and the highest channel fields as:

| Field Information | Length in bits |
|---|---|
| Lowest Protected Channel | 4 |
| Highest Protected Channel | 4 |

The Lowest Protected Channel field may include 4 bits, and it represents a signed integer in units of four IEEE channels from the channel to which the reservation message is transmitted. This channel is the lowest IEEE channel to which the secondary channel NAV is set.

The Highest Protected Channel field may also include 4 bits, and it represents a signed integer in units of 4 IEEE channels counted from the channel on which the reservation message is transmitted. The channels between the lowest and the highest IEEE channels are the channels to which the secondary channel NAV is set.

If non-contiguous transmission is also protected with the CTSS message, the Amount of Offsets and Channel Offset fields provide protection for the other non-contiguous band(s). The fields are set to the same value, if the protected channels are continuous. In some embodiments, the number of non-contiguous channels may be fixed to two and thus, the number of offsets and Channel offsets are not needed.

In connection with the transmission of the reservation message, the second communication device may calculate contention on the primary channel to which it is transmitting the reservation message so as to determine the availability of the primary channel for the transmission of the reservation message. If the primary channel of the other BSS is determined not to be free within the duration in which the reservation message should be transmitted, the second communication device may discard the reservation message and return to the primary channel of its BSS.

As mentioned above, multiple reservation (CTSS) messages may be transmitted to multiple channels in order to ensure that the NAV information is received by multiple BSSs. The CTSS message contains the identification of the channel area that is protected and protection duration fields. The CTSS frame distributes NAV information to the other BSSs and sets the other BSSs to mark the channels of the first BSS as occupied for the duration of the transmission. The communication device(s), e.g. an access point, of the other BSSs may then send an acknowledgement message to acknowledge the CTSS message. in an embodiment, the CTSS does not set the NAV to the channel to which it is transmitted, i.e. to primary channel of the other BSSs so they may carry out transmissions on their primary channels after the CTSS transmission. The CTSS frame itself reserves the primary channel channels at maximum for duration of transmission opportunity limit (TXOP Limit). It should be noted that TXOPLimit is specific to a network and an access category.

Substantially simultaneously with the transmission of the reservation frame, the first communication device carries out the data transmission in S5. The destination of the data transmission may be the second communication device or any other communication device (or devices) using the channels of the first BSS. Upon successful transmission of the data, the first communication device receives an acknowledgment message indicating successful reception of the data. Depending on the transmission type and recipient(s) amount and capabilities, the acknowledgement may be transmitted only on the primary channel or on all channels in which the data was transmitted.

In another embodiment, instead of transmitting the control frame, corresponding instructions for protecting the secondary channels is provided in the header of the data transmission.

First, the communicating device carries out a setup procedure in which determined header information is configured to trigger the secondary channel protection mechanism. The configuration mechanism may use CTSS Protection.request and CTSS.Protection.response messages.

Figure 7:
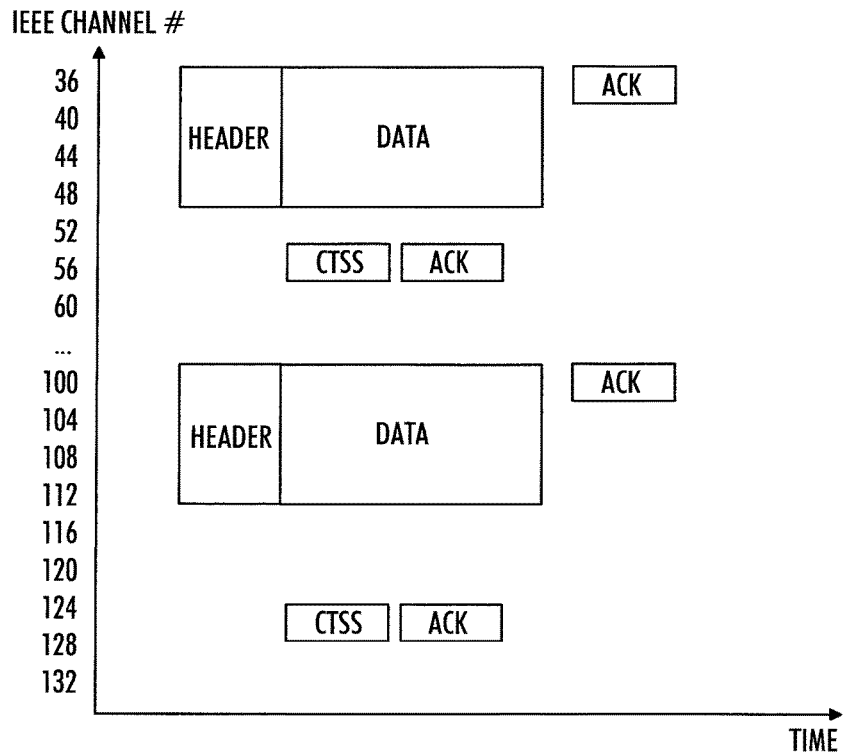
FIGS. 7 and 8 illustrate an embodiment for protecting transmissions on secondary channels by using a control header according to an embodiment of the invention.
Figure 8:
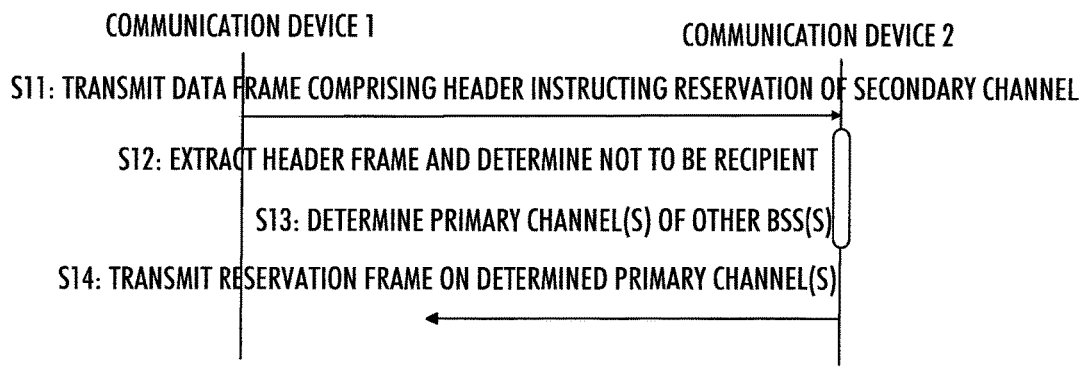
Figure 9:
FIG. 9 illustrates a format of the control header used in the embodiments of FIGS. 7 and 8.

FIGS. 7, 8, and 9 illustrate this embodiment. Referring to FIG. 8, the first communication device is about to carry out the data transmission. In S11, the first communication device starts the transmission of a data frame on the channels of the first BSS. The data frame comprises a header instructing the second communication device to carry out the transmission of the reservation frame. The header may comprise a PLOP header having a format illustrated in FIG. 9. The PLOP header comprises the VHT-SIG A field mentioned above, and the VHT-SIG A field may be used to carry out the above-mentioned trigger needed to instruct the second communication device to transmit the reservation message. The VHT-SIG A field according to an embodiment may have the following structure, although this structure is merely exemplary.

| Field | MU bit allocation | SU bit allocation | Description |
|---|---|---|---|
| Coding | 1-2 | 1-2 | 1 bit to indicate LDPC vs. BCC coding. |
| STBC | 1 | 1 | 1 bit to indicate Alamouti scheme |
| MCS | 0 | 4 | Equal modulation only MCS for MU in SIGB |
| GroupID | 6 | 6 | A value of zero indicates A single user transmission A transmission where the group membership has not yet been established A transmission that needs to bypass a group (e.g. broadcast) |
| $N_{STS}$ | 12 | 12 | For MU: 3 bits/user with maximum of 4 users For SU: first 3 bits contain stream allocation, remaining 9 bits contain partial AID. |
| Short GI | 2 | 2 | 1 bit to indicate L/S GI 1 bit for short GI packet length ambiguity mitigation |
| BW | 2-3 | 2-3 | Allows 20, 40, 80, 80 + 80 and 160 MHz modes. |

-continued

| Field | MU bit allocation | SU bit allocation | Description |
|---|---|---|---|
| Primary Channel Present | 1 | 1 | 1 = the primary channel is present in this set of consecutive channels. 0 = the continuous transmission bandwidth contains only secondary channels, i.e. (non-contiguous 160 MHz transmission) |
| Lowest is Primary Channel | 1 | 1 | 1 = The lowest 20 MHz contains the primary channel, 0 = the highest 20 MHz contains the primary channel. |
| CTSS Used | 1 | 1 | 1 = CTSS protection is performed for the transmission 0 = CTSS protection is not performed |
| Reserved | 5-7 | 1-3 | |
| CRC | 8 | 8 | |
| Tail | 6 | 6 | |

The VHT-SIG A field includes new fields: Primary channel present field indicates whether or not the primary channel is present on the band in which the VHT-SIG A is transmitted. It may be set to "1" on the band where the primary channel is present and to "0" on the other non-contiguous bands of the transmission. Is the Lowest band Primary channel field indicates the location of the primary channel, e.g. the lowest channel or the highest channel on the band, and CTSS protection field instructs the transmission of the reservation message. The duration of the PPDU in transmission may be calculated VHT-Sig-A MCS field which defines the modulation and conding scheme of the transmitted frame and on the Length field in VHT-SIG-B field. In another embodiment, the CTSS field is embedded in the GroupID field, and a specific GroupID value sets the device to transmit a CTSS frame with preconfigured Duration of Secondary Channel NAV field for example. GroupID field has unused bit combinations, and a given bit combination in the GroupID field may trigger the receiving communication device to transmit of the reservation message to the other BSSs. A communication device may have multiple configurations of CTSS frame transmissions. The transmission rate of the PLCP header may be 6 Mbps.

In S11, the second communication device detects the transmissions on the channels of the first BSS and extracts the header field in S12. In S12, the second communication device also determines whether or not it is the recipient of the data transmission. The second communication device may be configured to determine to be the recipient of the data transmission if the transmission is a broadcast transmission or if the second communication device is identified as the recipient in VHT-SIG B field of the PLCP header (see FIG. 9). If the second communication device is the destination of the data frame, it starts the reception of the data frame. On the other hand, if the second communication device is not the destination of the data frame, it responds to the instructions to protect the transmission, determines the secondary channels that are to be protected and immediately initiates transmission (S14) of the reservation message, e.g. the CTSS frame, to other BSSs on their respective primary channels that are determined in S13. In S14, the second communication device transmits the reservation message on the primary channel(s) of the other BSS(s). The transmission of the reservation message may be made in a manner similar to that described above in connection with FIGS. 5 and 6.

Similarly, the first communication device may receive reservation frames from other BSSs, wherein the reservation frames define channels that are protected for a given duration. Upon reception of the reservation message, the first communication device (and other communication devices of the first BSS) may mark the channels indicated in the reservation message as being occupied and prevent transmission on those channels. As a result, the secondary channels of the other BSS that transmitted the reservation message are protected, i.e. the other BSS may transmit on those channels reliably and the first BSS is also able to avoid those channels as transmissions on those channels probably result in collisions. Therefore, the performance of both BSSs is improved.

Figure 10:
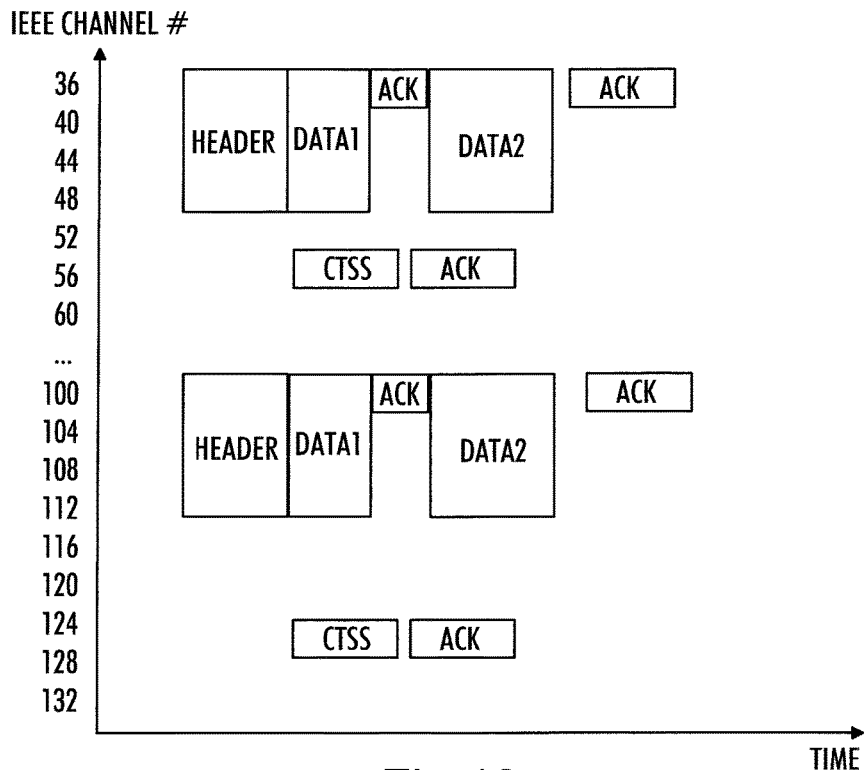
FIG. 10 illustrates an embodiment where data transmission is split into a plurality of sub-transmissions according to an embodiment of the invention.

FIG. 10 illustrates another embodiment that may be applied to any one of the embodiments described above in connection with FIGS. 5 to 9. In this embodiment, the data transmission is split into a plurality of sub-transmissions acknowledged separately such that an acknowledgment of a previous transmission is received before carrying out the subsequent transmission. According to this embodiment, the first communication device carrying out the data transmission may transmit the instructions to protect the secondary channels to the other communication devices of the first BSS in the header of the data transmission or in the separate control frame. With respect to the transmission of payload data, the first communication device first transmits a first portion of data to a destination communication device. Upon successful reception of the first portion of data, the destination communication device is configured to transmit an acknowledgment. Upon reception of the acknowledgment, the first communication device determines that the channel is protected and transmits the second portion of data. The second portion of data may comprise a greater amount of data than the first portion. The first portion may even be a test packet to test the channel. The second portion is also acknowledged by the destination communication device upon successful reception. This procedure is similar to Request-to-Send and Clear-to-Send procedure known in 802.11 networks. Instead of the request and response scheme, the test data or a small amount of payload data may be transmitted (and acknowledged) so as to verify that the channel is reliable for transmission.

Figure 11:
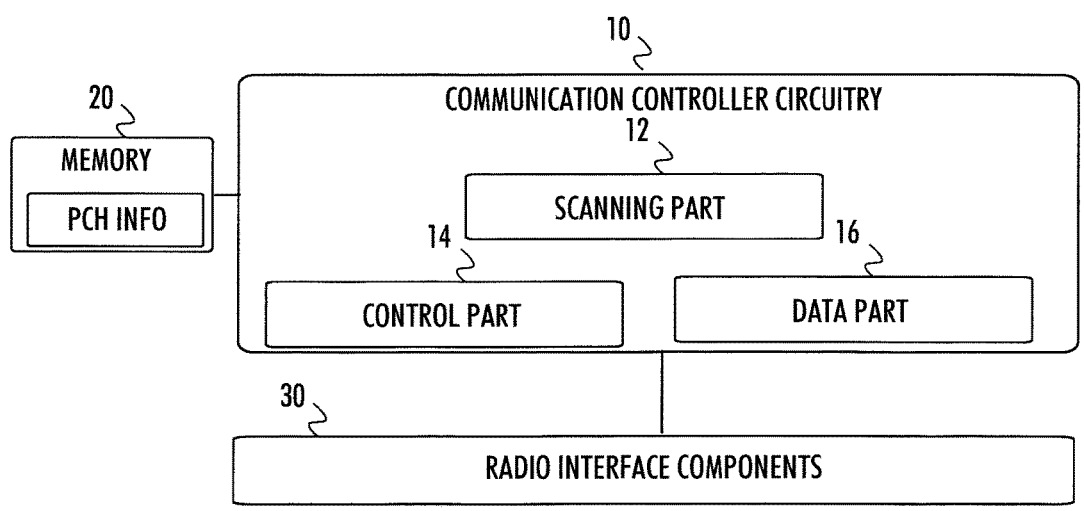
FIG. 11 illustrates a block diagram of an apparatus according to an embodiment of the invention.

FIG. 11 illustrates an embodiment of an apparatus comprising means for carrying out the above-mentioned functionalities. The apparatus may be a communication device of an IEEE 802.11 network or another wireless network, e.g. an AP or STA. The communication device may be a computer (PC), a laptop, a cellular phone, a palm computer, a fixed base station operating as the AP, or any other communication device. In another embodiment, the apparatus is comprised in such a communication device, i.e. the apparatus is a circuitry, e.g. a chip, a processor, a micro controller, or a combination of such circuitries in the communication device.

The apparatus may comprise a communication controller circuitry 10 configured to control the communications in the communication device. The communication controller circuitry 10 may comprise a control part 14 handling control signaling communication with respect to transmission, reception, and extraction of control frames and reservation frames, as described above. The communication controller circuitry 10 may further comprise a data part 16 that handles transmission and reception of payload data. The communication controller circuitry 10 may further comprise a scanning part 12 controlling the communication device to scan for the BSS other than the one to which the communication device belongs. Upon detection of another BSS transmission, the scanning part may derive the location of the primary channel of the other BSS from the transmission and store the primary channel information in a memory 20.

During idle mode of the communication device, i.e. when the communication device is not carrying out a data transmission or reception, the control part 14 may monitor the channels of the BSS of the communication device for transmissions destined to the communication device. Meanwhile, the scanning part 12 may select the channels to scan for other BSSs and process any transmissions received from the scanned channels that are not destined to the communication device. Upon detection of a transmission, the control part 14 may extract the information contained in the transmission. If the transmission instructs the communication device to protect the secondary channels, the control part 14 may retrieve from the memory 20 the primary channels of the other BSSs and control transmission of the reservation message on the retrieved primary channels of the other BSSs, as described above. When the control part 14 determines that the communication device is the recipient for the data transmission, it controls the data part 16 to receive the data transmission. When transmitting data, the control part 14 may derive the control information necessary to instruct other communication devices of the BSS to protect the secondary channels. The control part 14 may multiplex such information on the control frame or to the header of the data transmission, as described above. With respect to the periodic transmission of information on the channels of the BSS to other BSSs, the control part 14 may comprise a scheduler that determines the transmission timings of the measurement pilot frames (or another frame used to transmit the channel information). The control part derives the contents of the measurement pilot frames and information on the primary channels of the other BSSs, and controls the transmission of the measurement pilot frames on the primary channels of the other BSSs.

The circuitries 12 to 14 of the communication controller circuitry 10 may be carried out by the one or more physical circuitries or processors. In practice, the different circuitries may be realized by different computer program modules.

The apparatus may further comprise the memory 20 that stores computer programs configuring the apparatus to perform the above-described functionalities of the communication device. The memory 20 may also store communication parameters and other information needed for the wireless communications. The memory 708 may also store a database storing the primary channels of the detected BSSs, as described above. The apparatus may further comprise radio interface components 30 providing the apparatus with radio communication capabilities within the BSS and with other BSSs. The radio interface components 30 may comprise standard well-known components such as amplifier, filter, frequency-converter, (de)modulator, and encoder/decoder circuitries and one or more antennas. The communication device may further comprise a user interface enabling interaction with the user of the communication device. The user interface may comprise a display, a keypad or a keyboard, a loudspeaker, etc.

In an embodiment, the apparatus carrying out the embodiments of the invention in the communication device comprises at least one processor and at least one memory including a computer program code, wherein the at least one memory and the computer program code are configured, with the at least one processor, to cause the apparatus to carry out the steps of the process of FIG. 2. In further embodiments, the at least one memory and the computer program code are configured, with the at least one processor, to cause the apparatus to carry out any one of the embodiments related to the cooperative protection of channels, as described above in connection with FIGS. 2 to 10. Accordingly, the at least one processor, the memory, and the computer program code form processing means to carry out embodiments of the present invention in the wireless communication device.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or application specific integrated circuit (ASIC) for a wireless communication device.

The processes or methods described in FIGS. 2 to 10 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

Let us now describe embodiments of the present invention. An embodiment provides a method comprising: determining, in a communication device of a first basic service set comprising a group of communication devices of a wireless telecommunication network, a primary channel of a second basic service set different from said first basic service set; and causing transmission of channel identification information defining a location of at least one channel of the first basic service set from the communication device to the second basic service set on the determined primary channel of the second basic service set.

In an embodiment, the channel identification information defines the location of at least one secondary channel of the first basic service set.

In an embodiment, the wireless telecommunication network of the first basic service set and the second service set follows specifications based on at least one of evolution versions of IEEE 802.11.

In an embodiment, the determination comprises determining a frequency channel of the primary channel of the second basic service set on the basis of overlapping secondary channels of the first basic service set and the second basic service set. In an embodiment, the determination comprises: detecting, in the communication device, a data transmission on a secondary channel of the first basic service set; determining from control information comprised in the detected data transmission that the detected data transmission is carried out by the second basic service set; and determining the location of the primary control channel of the second basic service set from said control information comprised in the detected data transmission.

In an embodiment, the determination comprises: monitoring at least one frequency channel for at least one of beacon frames and probe response frames; and determining a frequency channel of the primary channel of the second basic service set by determining on which channel or channels a beacon frame or a probe response is received from the second basic service set.

In an embodiment, causing the transmission of the channel identification information further comprises: causing the transmission of the channel identification information in a measurement pilot frame transmitted at determined time intervals and broadcasted or addressed to at least one communication device of the second basic service set.

In an embodiment, the channel identification information comprises a medium access control address of said communication device, an information element indicating the location of said at least one of: at least one secondary channel of the first basic service set and, when the basic service set employs at least two non-contiguous frequency bands, the locations of the at least two non-contiguous frequency bands.

In an embodiment, causing the transmission of the channel identification information further comprises: before data transmission in the first basic service set, receiving a control frame instructing the communication device to transmit a reservation frame on the primary channel of at least the second basic service set, wherein the reservation frame prevents the communication devices of the second basic service set from carrying out data transmission on the at least one secondary channel of the first basic service set; and causing transmission of the reservation frame on the primary channel of at least the second basic service set, thereby preventing the communication devices of the second basic service set from carrying out data transmission on the at least one secondary channel of the first basic service set.

In an embodiment, the method further comprises: before carrying out data transmission in the first basic service set, transmitting a control frame instructing the other communication devices of the first basic service set to transmit a reservation frame on the primary channel of at least the second basic service set, wherein the reservation frame prevents the communication devices of the second basic service set from carrying out data transmission on the at least one secondary channel of the first basic service set; and carrying out the data transmission after transmitting the control frame, wherein the data transmission is carried out by using a different frame than the control frame.

In an embodiment, the control frame is a protecting multi-poll frame specifying at least the duration and frequency channels for the data transmission.

In an embodiment, the method further comprises: during data transmission in the first basic service set, receiving a header comprising at least one information element instructing the communication device to transmit said reservation frame on the primary channel of at least the second basic service set, wherein the reservation frame prevents the communication devices of the second basic service set from carrying out data transmission on the at least one secondary channel of the first basic service set; and upon detection of the control frame and in response to the instructions comprised in the control frame, causing transmission of the reservation frame on the primary channel of at least the second basic service set, thereby preventing the communication devices of the second basic service set from carrying out data transmission on the at least one secondary channel of the first basic service set.

In an embodiment, the method further comprises: when transmitting data in the first basic service set, transmitting said header comprising at least one information element instructing the other communication devices of the first basic service set to transmit said reservation frame on the primary channel of at least the second basic service set, wherein the reservation frame prevents the communication devices of the second basic service set from carrying out data transmission on the at least one secondary channel of the first basic service set. In an embodiment, the header comprises at least one very high throughput signal field comprising an information element instructing the transmission of the reservation frame.

In an embodiment, the reservation frame is a clear-to-send simultaneously frame of IEEE 802.11 configuring a network allocation vector setting for the channels indicated in the reservation frame.

In an embodiment, the at least one secondary channel is used by the communication device optionally for data transmission simultaneously when the communication device transmits data on the primary channel.

An embodiment of the invention provides an apparatus comprising: at least one processor; and at least one memory including a computer program code. The at least one memory and the computer program code are configured, with the at least one processor, to cause the apparatus to: cause a communication device of a first basic service set comprising a group of communication devices of a wireless telecommunication network, to determine a primary channel of a second basic service set different from said first basic service set; and cause transmission of channel identification information defining a location of at least one channel of the first basic service set from the communication device to the second basic service set on the determined primary channel of the second basic service set.

In an embodiment, the channel identification information defines the location of at least one secondary channel of the first basic service set.

In an embodiment, the wireless telecommunication network of the first basic service set and the second service set follows specifications based on at least one of evolution versions of IEEE 802.11.

In an embodiment, the at least one memory and the computer program code are configured, with the at least one processor, to cause the apparatus to determine a frequency channel of the primary channel of the second basic service set on the basis of overlapping secondary channels of the first basic service set and the second basic service set.

In an embodiment, the at least one memory and the computer program code are configured, with the at least one processor, to cause the apparatus to carry out the determination by detecting a data transmission on a secondary channel of the first basic service set, by determining from control information comprised in the detected data transmission that the detected data transmission is carried out by the second basic service set, and by determining the location of the primary control channel of the second basic service set from said control information comprised in the detected data transmission.

In an embodiment, the at least one memory and the computer program code are configured, with the at least one processor, to cause the apparatus to carry out the determination by monitoring at least one frequency channel for at least one of beacon frames and probe response frames, and by determining a frequency channel of the primary channel of the second basic service set by determining on which channel or channels a beacon frame or a probe response is received from the second basic service set.

In an embodiment, the at least one memory and the computer program code are configured, with the at least one processor, to cause the apparatus to cause the transmission of the channel identification information by causing the transmission of the channel identification information in a measurement pilot frame transmitted at determined time intervals and broadcasted or addressed to at least one communication device of the second basic service set.

In an embodiment, the channel identification information comprises a medium access control address of said communication device, an information element indicating the location of said at least one of: at least one secondary channel of the first basic service set and, when the basic service set employs at least two non-contiguous frequency bands, the locations of the at least two non-contiguous frequency bands.

In an embodiment, the at least one memory and the computer program code are configured, with the at least one processor, to cause the apparatus to: receive, before data transmission in the first basic service set, a control frame instructing the communication device to transmit a reservation frame on the primary channel of at least the second basic service set, wherein the reservation frame prevents the communication devices of the second basic service set from carrying out data transmission on the at least one secondary channel of the first basic service set; and cause transmission of the reservation frame on the primary channel of at least the second basic service set, thereby preventing the communication devices of the second basic service set from carrying out data transmission on the at least one secondary channel of the first basic service set.

In an embodiment, the at least one memory and the computer program code are configured, with the at least one processor, to cause the apparatus to: before carrying out data transmission in the first basic service set, transmit a control frame instructing the other communication devices of the first basic service set to transmit a reservation frame on the primary channel of at least the second basic service set, wherein the reservation frame prevents the communication devices of the second basic service set from carrying out data transmission on the at least one secondary channel of the first basic service set; and carry out the data transmission after transmitting the control frame, wherein the data transmission is carried out by using a different frame than the control frame.

In an embodiment, the control frame is a protecting multi-poll frame specifying at least the duration and frequency channels for the data transmission.

In an embodiment, the at least one memory and the computer program code are configured, with the at least one processor, to cause the apparatus to: during data transmission in the first basic service set, receive a header comprising at least one information element instructing the communication device to transmit said reservation frame on the primary channel of at least the second basic service set, wherein the reservation frame prevents the communication devices of the second basic service set from carrying out data transmission on the at least one secondary channel of the first basic service set; and upon detection of the control frame and in response to the instructions comprised in the control frame, cause transmission of the reservation frame on the primary channel of at least the second basic service set, thereby preventing the communication devices of the second basic service set from carrying out data transmission on the at least one secondary channel of the first basic service set.

In an embodiment, the at least one memory and the computer program code are configured, with the at least one processor, to cause the apparatus to: when transmitting data in the first basic service set, cause transmission of said header comprising at least one information element instructing the other communication devices of the first basic service set to transmit said reservation frame on the primary channel of at least the second basic service set, wherein the reservation frame prevents the communication devices of the second basic service set from carrying out data transmission on the at least one secondary channel of the first basic service set.

In an embodiment, the header comprises at least one very high throughput signal field comprising an information element instructing the transmission of the reservation frame.

In an embodiment, the reservation frame is a clear-to-send simultaneously frame of IEEE 802.11 configuring a network allocation vector setting for the channels indicated in the reservation frame.

In an embodiment, the at least one secondary channel is used by the communication device optionally for data transmission simultaneously when the communication device transmits data on the primary channel.

In an embodiment, the apparatus further comprises a radio transceiver circuitry configured to provide the apparatus with radio communication capability.

An embodiment provides an apparatus comprising means for carrying out any one of the above-described methods, processes and/or functionalities of the wireless communication device.

An embodiment provides computer program product embodied on a distribution medium readable by a computer and comprising program instructions which, when loaded into an apparatus, execute any one of the above-described methods, processes and/or functionalities.

The present invention is applicable to wireless telecommunication systems defined above but also to other suitable telecommunication systems. The protocols used, the specifications of such wireless telecommunication systems, their network elements and terminal devices, develop rapidly. Such development may require extra changes to the described embodiments. Therefore, all words and expressions should be interpreted broadly and they are intended to illustrate, not to restrict, the embodiment. Furthermore, while the embodiments of the invention have been described in the context of the IEEE 802.11 networks, embodiments of the invention may be applicable to other systems as well. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   determining, by a communication device of a first basic service set comprising a group of communication devices of a wireless telecommunication network, a primary channel of a second basic service set different from said first basic service set; and
   causing, by the communication device, transmission of channel identification information defining a location of at least one channel of the first basic service set from the communication device to the second basic service set on the determined primary channel of the second basic service set, for protecting transmissions on one or more secondary channels of the first basic service set,
   wherein the determined primary channel of the second basic service set is different from a primary channel of the first basic service set, and wherein the communication device is not part of the second basic service set.

2. The method of claim 1, wherein the channel identification information defines the location of at least one secondary channel of the first basic service set.

3. The method of claim 1, wherein the wireless telecommunication network of the first basic service set and the second service set follows specifications based on at least one of evolution versions of IEEE 802.11.

4. The method of claim 1, wherein the determination comprises determining a frequency channel of the primary channel of the second basic service set on the basis of overlapping secondary channels of the first basic service set and the second basic service set.

5. The method of claim 4, Wherein the determination comprises:
   detecting, in the communication device, a data transmission on a secondary channel of the first basic service set;
   determining from control information comprised in the detected data transmission that the detected data transmission is carried out by the second basic service set; and
   determining the location of the primary control channel of the second basic service set from said control information comprised in the detected data transmission.

6. The method of claim 1, wherein the determination comprises:
   monitoring at least one frequency channel for at least one of beacon frames and probe response frames; and
   determining a frequency channel of the primary channel of the second basic service set by determining on which channel or channels a beacon frame or a probe response is received from the second basic service set.

7. The method of claim 1, wherein causing the transmission of the channel identification information further comprises: causing the transmission of the channel identification information in a measurement pilot frame transmitted at determined time intervals and broadcasted or addressed to at least one communication device of the second basic service set.

8. The method of claim 1, wherein causing the transmission of the channel identification information further comprises:
   before data transmission in the first basic service set, receiving a control frame instructing the communication device to transmit a reservation frame on the primary channel of at least the second basic service set, wherein the reservation frame prevents the communication devices of the second basic service set from carrying out data transmission on the at least one secondary channel of the first basic service set; and
   causing transmission of the reservation frame on the primary channel of at least the second basic service set, thereby preventing the communication devices of the second basic service set from carrying out data transmission on the at least one secondary channel of the first basic service set.

9. The method of claim 1, further comprising:
   before carrying out data transmission in the first basic service set, transmitting a control frame instructing the other communication devices of the first basic service set to transmit a reservation frame on the primary channel of at least the second basic service set, wherein the reservation frame prevents the communication devices of the second basic service set from carrying out data transmission on the at least one secondary channel of the first basic service set; and
   carrying out the data transmission after transmitting the control frame, wherein the data transmission is carried out by using a different frame than the control frame.

10. The method of claim 1, wherein the at least one secondary channel is used by the communication device optionally for data transmission simultaneously when the communication device transmits data on the primary channel.

11. An apparatus comprising:
    at least one processor; and
    at least one memory including a computer program code, wherein the at least one memory and the computer program code are configured, with the at least one processor, to cause the apparatus to:
    cause a communication device of a first basic service set comprising a group of communication devices of a wireless telecommunication network, to determine a primary channel of a second basic service set different from said first basic service set; and
    cause, by the communication device, transmission of channel identification information defining a location of at least one channel of the first basic service set from the communication device to the second basic service set on the determined primary channel of the second basic service set, for protecting transmissions on one or more secondary channels of the first basic service set, wherein the determined primary channel of the second basic service set is different from a primary channel of the first basic service set, and wherein the communication device is not part of the second basic service set.

12. The apparatus of claim 11, wherein the channel identification information defines the location of at least one secondary channel of the first basic service set.

13. The apparatus of claim 11, wherein the wireless telecommunication network of the first basic service set and the second service set follows specifications based on at least one of evolution versions of IEEE 802.11.

14. The apparatus of claim 11, wherein the at least one memory and the computer program code are configured, with the at least one processor, to cause the apparatus to determine a frequency channel of the primary channel of the second basic service set on the basis of overlapping secondary channels of the first basic service set and the second basic service set.

15. The apparatus of claim 14, wherein the at least one memory and the computer program code are configured, with the at least one processor, to cause the apparatus to carry out the determination by detecting a data transmission on a secondary channel of the first basic service set, by determining from control information comprised in the detected data transmission that the detected data transmission is carried out by the second basic service set, and by determining the location of the primary control channel of the second basic service set from said control information comprised in the detected data transmission.

16. The apparatus of claim 11, wherein the at least one memory and the computer program code are configured, with the at least one processor, to cause the apparatus to carry out the determination by monitoring at least one frequency channel for at least one of beacon frames and probe response frames, and by determining a frequency channel of the primary channel of the second basic service set by determining on which channel or channels a beacon frame or a probe response is received from the second basic service set.

17. The apparatus of claim 11, wherein the at least one memory and the computer program code are configured, with the at least one processor to cause the apparatus to cause the transmission of the channel identification information by causing the transmission of the channel identification information in a measurement pilot frame transmitted at determined time intervals and broadcasted or addressed to at least one communication device of the second basic service set.

18. The apparatus of claim 11, wherein the at least one memory and the computer program code are configured, with the at least one processor, to cause the apparatus to:

receive, before data transmission in the first basic service set, a control frame instructing the communication device to transmit a reservation frame on the primary channel of at least the second basic service set, wherein the reservation frame prevents the communication devices of the second basic service set from carrying out data transmission on the at least one secondary channel of the first basic service set; and cause transmission of the reservation frame on the primary channel of at least the second basic service set, thereby preventing the communication devices of the second basic service set from carrying out data transmission on the at least one secondary channel of the first basic service set.

19. The apparatus of claim 11, wherein the at least one memory and the computer program code are configured, with the at least one processor, to cause the apparatus to:

before carrying out data transmission in the first basic service set, transmit a control frame instructing the other communication devices of the first basic service set to transmit a reservation frame on the primary channel of at least the second basic service set, wherein the reservation frame prevents the communication devices of the second basic service set from carrying out data transmission on the at least one secondary channel of the first basic service set; and carry out the data transmission after transmitting the control frame, wherein the data transmission is carried out by using a different frame than the control frame.

20. The apparatus of claim 11, wherein the at least one secondary channel is used by the communication device optionally for data transmission simultaneously when the communication device transmits data on the primary channel.

* * * * *